United States Patent [19]

Sung

[11] Patent Number: 5,314,579
[45] Date of Patent: May 24, 1994

[54] PROCESS FOR REMOVING HYDROCARBONS FROM POLYMER SLURRIES

[75] Inventor: Chieh-Yuan F. Sung, Cincinnati, Ohio

[73] Assignee: Quantum Chemical Corporation, Cincinnati, Ohio

[21] Appl. No.: 995,356

[22] Filed: Dec. 22, 1992

Related U.S. Application Data

[63] Continuation of Ser. No. 820,157, Jan. 13, 1992, abandoned.

[51] Int. Cl.$^5$ .......................... B01D 1/00; B01D 3/06
[52] U.S. Cl. ................................. 159/47.1; 159/2.1; 159/DIG. 2; 159/DIG. 3; 159/DIG. 10; 203/88; 210/768; 210/806; 210/807; 528/501
[58] Field of Search ................. 203/88; 159/47.1, 2.1, 159/DIG. 2, DIG. 3, DIG. 10; 210/180, 181, 768, 774, 807, 806; 528/483, 501, 503

[56] References Cited

U.S. PATENT DOCUMENTS

| | | | |
|---|---|---|---|
| 2,472,037 | 5/1949 | Wurth et al. | 159/DIG. 10 |
| 2,849,429 | 8/1958 | Cines | 159/DIG. 10 |
| 2,949,447 | 8/1960 | Hawkins et al. | 159/DIG. 10 |
| 2,953,557 | 9/1960 | Wride et al. | 159/DIG. 10 |
| 2,957,855 | 10/1960 | McLeod | 159/DIG. 10 |
| 3,004,019 | 10/1961 | Stevens et al. | 159/DIG. 10 |
| 3,070,586 | 12/1962 | Barber et al. | 159/DIG. 10 |
| 3,326,781 | 6/1967 | Wilson, Jr. | 159/DIG. 10 |
| 3,458,494 | 7/1969 | Scoggin | 159/DIG. 10 |
| 4,424,341 | 1/1984 | Hanson et al. | 528/501 |
| 4,499,263 | 2/1985 | Messura et al. | 528/483 |
| 4,521,590 | 6/1985 | Elliot et al. | 159/DIG. 10 |
| 4,532,024 | 7/1985 | Huschke et al. | 203/68 |
| 4,906,329 | 3/1990 | Tominari et al. | 159/47.1 |
| 5,183,866 | 2/1993 | Hottovy | 528/501 |

FOREIGN PATENT DOCUMENTS 0188125 of 1986 European Pat. Off. .

*Primary Examiner*—Virginia Manoharan
*Attorney, Agent, or Firm*—William A. Heidrich

[57] ABSTRACT

A highly energy efficient process for removing hydrocarbons from polymer slurries is disclosed. The process includes feeding a hydrocarbon-containing polymer slurry to a flash tank to flash a portion of the hydrocarbon from the slurry. Thereafter, the resulting slurry is fed to a fluid bed dryer wherein additional hydrocarbon is stripped from the polymer. Subsequently, the resulting polymer powder is transferred to a powder silo wherein further hydrocarbon is removed from the polymer utilizing a heated purge gas flowing countercurrent to the polymer powder. The polymer output preferably has a low hydrocarbon content, on the order of 100 ppm or less.

15 Claims, 1 Drawing Sheet

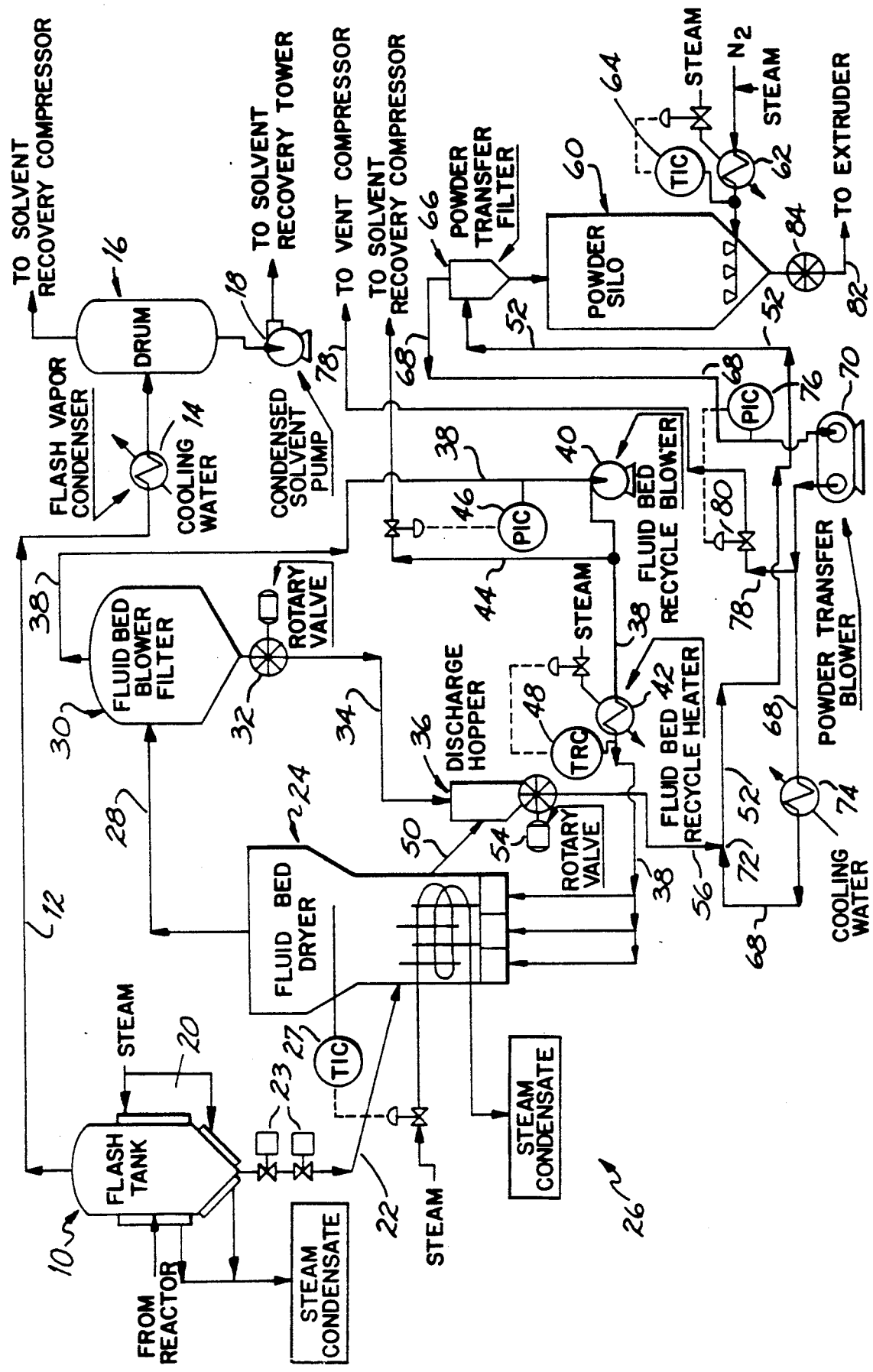

PROCESS FOR REMOVING HYDROCARBONS FROM POLYMER SLURRIES

This application is a continuation of application Ser. No. 07/820,157, filed Jan. 13, 1992, abandoned.

FIELD OF THE INVENTION

The present invention is directed to a process for reducing hydrocarbon emissions, and more particularly to an energy efficient process for removing hydrocarbons from polymer slurries.

BACKGROUND OF THE INVENTION

The production of solid polymer particles which are suitable for pelletization and use in subsequent manufacturing processes may be accomplished by any one of many known polymerization techniques in a polymerization reactor. In such processes, the polymer slurry effluent from the reactor typically consists of the particulate polymer formed in the reactor suspended in liquid hydrocarbon diluent, which acts as the polymerization reaction medium. The diluent may be an inert solvent or excess monomer or comonomer. As an example, when ethylene is polymerized in a hydrocarbon diluent such as isobutane under controlled temperature and pressure conditions, a slurry of polymer solids and diluent is formed. This type of process is known as particle form polymerization. One drawback of this kind of process, or any process in which a polymer is prepared in solution and subsequently precipitated to form a slurry, is that the solid polymer must be separated from the liquid portion of the slurry. This liquid portion may include any suitable solvent(s) (diluent) utilized in the particular polymerization process (typically these are $C_3$-$C_8$ hydrocarbons) and/or unpolymerized monomer or comonomer, all of which will be hereinafter referred to collectively as "hydrocarbon." The term "hydrocarbon" is not intended to include the polymer itself.

In certain polymer recovery processes, which are known as "wet" processes, water is added to the polymer slurry as it exits the reactor to facilitate pumping the slurry through the polymer recovery system. Improvements in hydrocarbon removal from polymer slurries in "wet" recovery processes are the subject of copending application Ser. No. 07/739,876, filed Aug. 2, 1991, now U.S. Pat. No. 5,207,929, issued May 4, 1993, naming Chieh-Yuan F. Sung and Stephen Krause as coinventors. The methods and apparatus disclosed in the referenced copending application provide excellent results in terms of reduction of hydrocarbon emissions. Such methods and apparatus may require additional energy expenditures, however, since the water initially added to the slurry must subsequently be removed.

In other conventional polymer recovery processes, which are known as "dry" processes, no water is added to the polymer slurry. In an example of a conventional dry process, polymer slurry from a polymerization reactor is fed to a flash tank operated at low pressure (on the order of 1-2 psig) to flash a portion of the hydrocarbon therefrom. Recovery of the flashed hydrocarbon vapor typically requires recompression prior to recovery. The recompression of the vapor is an energy intensive step which adds significantly to the energy consumption and cost of the overall process. Subsequently, polymer powder from the flash tank is fed to a heated mechanical conveyor dryer which vaporizes additional hydrocarbon from the polymer powder. Although this drying step removes some additional hydrocarbon from the polymer powder, a significant amount of hydrocarbon remains in the powder. The polymer is then conveyed to a powder silo via a purge conveyor which utilizes nitrogen as a purge gas to remove additional hydrocarbon. Because the polymer output from the previous drying step contains substantial unvaporized hydrocarbon, the nitrogen purge gas in the purge conveyor picks up a substantial amount of hydrocarbon which must subsequently be removed from the purge gas. This is accomplished by compression and condensation, which further add to the overall energy consumption and costs of the recovery process.

What is needed is a polymer recovery process which is both highly energy efficient and serves to significantly reduce hydrocarbon emissions to the atmosphere.

SUMMARY OF THE INVENTION

The present invention is directed to an improved "dry" process for removing hydrocarbons from polymer slurries which reduces the undesirable emission of hydrocarbons to the atmosphere. The process is additionally advantageous since it provides highly energy efficient results.

The process of the present invention is applicable to remove hydrocarbons from polymer slurries wherein the polymer is carried in a liquid hydrocarbon, which is defined herein to include solvent diluents and/or unreacted monomer or comonomer. Since the process is a "dry" process which omits the addition of water to the polymer slurry, it is more energy efficient than prior art "wet"-type processes. Furthermore, as will become apparent from the ensuing description, the process provides enhanced reduction of hydrocarbon emissions with increased energy efficiency as compared to conventional "dry" recovery processes. In a preferred embodiment, the process removes isobutane solvent from a polyethylene/isobutane slurry. It is contemplated that the process of the present invention will provide a reduction of residual isobutane solvent to less than about 100 ppm solvent by weight based on polymer weight output.

In its broadest aspects, the process of the present invention includes a first step of feeding a hydrocarbon-containing polymer slurry to a flash tank operated at a suitable temperature and pressure to flash a portion of the hydrocarbon from the slurry. The operating pressure in the flash tank is typically substantially lower than that in the polymerization reactor from which the slurry is fed. This pressure differential, along with the sensible heat of the polymer and the operating temperature in the flash tank preferably result in the vaporization of about 80-90% of the hydrocarbon in the slurry. Thereafter, the resulting slurry from the flash tank is fed to a fluid bed dryer. Additional hydrocarbon is stripped from the polymer in the fluid bed dryer utilizing as the stripping gas heated hydrocarbon, preferably of the same composition as the hydrocarbon being removed from the polymer. Finally, the resulting polymer from the fluid bed dryer is transferred to a vessel such as a powder silo wherein additional hydrocarbon is removed therefrom utilizing a heated purge gas flowing countercurrent to the polymer in the powder silo. The polymer output from the powder silo may then be subjected to suitable further processing, such as extrusion, to form pellets, etc.

In a further aspect of the invention, the hydrocarbon flashed from the polymer slurry in the flash tank is vented from the tank and the major portion thereof (80–90%) is recovered in a suitable condenser, such as a cooling water condenser. The remainder of the flashed vapor is fed to a solvent (hydrocarbon) recovery compressor. A significant advantage of the process of the present invention is the reduced energy consumption which results from condensing a major portion of the flashed vapor in a cooling water condenser, rather than using an energy intensive compressor. It is possible to condense a large percentage of the flashed vapor simply using a cooling water condenser because the flash tank is operated at a relatively high pressure (about 70–120 psig) vis-a-vis atmospheric pressure, and the temperature drop through the condenser is sufficient to condense on the order of 80–90% of the vapor.

In an additional aspect of the invention, the hydrocarbon output from the fluid bed dryer, which consists of the stripping gas and the hydrocarbon stripped from the polymer powder, is filtered to remove any polymer entrained therein. A portion of the filtered gas is recycled as the stripping gas in the fluid bed dryer and a portion thereof is vented to maintain a relatively constant volume stripping gas loop and is recovered in a suitable condenser.

Operation of the flash tank at relatively low pressure vis-a-vis the pressure in the polymer reactor results in vaporization of a high proportion of the hydrocarbon in the polymer slurry, and operation at a relatively high pressure via-a-vis atmospheric facilitates the condensation and recovery of the vented hydrocarbon therefrom, thereby reducing the overall energy required in the recovery process of the present invention. Furthermore, the use of heated hydrocarbon to strip the hydrocarbon from the polymer in the fluid bed dryer, together with the countercurrent purge in the powder silo results in a highly energy efficient process for removing hydrocarbons from polymer slurries, as well as resulting in significantly reduced hydrocarbon emissions.

These and other features and advantages of the present invention will become apparent to persons skilled in the art upon reading the detailed description of the invention which follows.

BRIEF DESCRIPTION OF THE DRAWINGS

The FIGURE schematically illustrates a preferred embodiment of the present invention.

DETAILED DESCRIPTION OF THE INVENTION

The present invention is directed to an energy efficient process for the removal of hydrocarbons from polymer slurries. In a particular application of the present invention, isobutane solvent is removed from a polyethylene polymer slurry. For purposes of the description and examples herein, reference is made to isobutane solvent as the specific hydrocarbon being removed, and polyethylene as the polymer in the slurry; however, the scope of the invention is not to be construed as limited to those specific compounds. It will be appreciated that the process of the present invention has broader applicability to the removal of various hydrocarbons from slurries containing polymers other than polyethylene, including the removal of excess monomer or comonomer from the residual slurry from a polymerization reactor.

In the process of the present invention as shown in the FIGURE, a polymer slurry containing solvent (hydrocarbon) is fed from a polymerization reactor (not shown) to a flash tank 10 which is of conventional design and has a conical lower section. A portion of the solvent is flashed from the polymer slurry in flash tank 10. Depending upon the specific hydrocarbon or solvent to be removed and the type of polymer in the slurry, flash tank 10 is operated at a suitable temperature and pressure, and the slurry has a sufficient residence time in tank 10 so as to flash on the order of 80–90% of the hydrocarbon from the slurry. This high percentage of hydrocarbon vaporization is achieved at least in part because of the significant pressure drop from the polymerization reactor to the flash tank 10. For example, in the case where the polymer slurry is a polyethylene slurry containing isobutane solvent, the polymerization reactor may be operated at a pressure of about 600 psig and at a temperature of about 210° F. The flash tank 10 on the other hand is preferably operated at a pressure in the range of about 70–120 psig and at a temperature in the range of about 110°–135° F. The pressure drop, the sensible heat of the polymer, and the heat transferred to flash tank 10 by means of a conventional steam jacket arrangement designated generally as 20, all combine to vaporize 80–90% of the hydrocarbon in the slurry. The slurry preferably has a residence time of about 15 minutes in flash tank 10.

The solvent flashed from the slurry in tank 10 is vented from tank 10 and passes via line 12 through a conventional cooling water condenser 14. Condenser 14 may preferably be operated to cool and condense a major portion of the flashed vapor at about 100° F. With the operating pressure in flash tank 10 being between about 70–110 psig, on the order of 80–90% of the flashed vapor is condensed at 100° F. in condenser 14. The partially condensed vapor is separated in condensed solvent drum 16. The vapor flows to a suitable solvent recovery compressor and the liquid is pumped by means of pump 18 to a solvent recovery tower (not specifically shown). Since a large proportion (80–90%) of the flashed vapor is condensed in condenser 14, only a relatively small portion (10–20%) must be compressed. This is significant since utilizing a compressor to liquefy vapor is comparatively energy intensive relative to condensing vapor in a cooling water condenser. It is because the operating pressure in the flash tank 10 (70–110 psig) is relatively high vis-a-vis atmospheric pressure that such a large proportion of the flashed vapor can be condensed in condenser 14, thus significantly adding to the overall energy efficiency of the entire process.

The polymer powder recovered from flash tank 10, which contains additional solvent (hydrocarbon), flows from flash tank 10 via line 22 to fluid bed dryer 24 through suitable valves, such as timed valves 23, which operate as lock hoppers. The valves 23 operate so that the only vapor depressurized to fluid bed dryer 24 is that contained in the polymer powder void spaces.

Fluid bed dryer 24 is preferably heated by steam coils in a steam system designated generally as 26, which is supplied with steam at about 220° F. Steam system 26 includes a temperature sensor 27 which monitors the temperature of the polymer powder in fluid bed dryer 24 and controls the flow of steam to maintain the desired polymer temperature. Fluidization of the polymer powder containing additional liquid hydrocarbon and stripping of hydrocarbon therefrom in fluid bed dryer 24 is accomplished by utilizing heated hydrocarbon vapor. In the case where the polymer is a polyethylene powder containing isobutane solvent, fluid bed dryer 24 is preferably operated at a pressure of about 1-2 psig and the polymer has a residence time in fluid bed dryer in the range of about 7-15 minutes. Additionally, the fluidization/stripping gas utilized in the fluid bed dryer is isobutane and is preferably heated to about 220° F. This step removes substantially all remaining liquid hydrocarbon from the polymer powder.

Vapor leaving fluid bed dryer 24 via overhead line 28 consists of the stripping gas, the hydrocarbon stripped from the polymer powder, and some entrained powder. This vapor stream is filtered in filter 30. The entrained powder collected flows through a valve, such as rotary valve 32, via line 34 to fluid bed dryer discharge hopper 36, wherein it is combined with the primary polymer powder output from fluid bed dryer 24.

The vapor leaving filter 30 overhead is recycled and circulated via recycle line 38 by fluid bed recycle blower 40 through a duct-type steam heater 42 to bring the temperature back up to 220° F. The heated vapor is then fed to fluid bed dryer 24 to complete the vapor loop. In order to maintain a relatively constant flow and pressure of stripping vapor in the fluid bed dryer, it is necessary to vent a portion of the recycled vapor prior to recycling to fluid bed dryer 24 since additional vapor volume is picked up in dryer 24. The necessary volume of vapor is vented from recycle line 38 via valved vent line 44. A suitable pressure monitor/valve controller 46 is used to control the venting of excess vapor from recycle line 38. The vented vapor is fed to a suitable solvent (hydrocarbon) vapor compressor for recovery. Recycle line 38 is further provided with a temperature sensor/steam valve controller 48 which monitors the temperature of the heated vapor leaving heater 42 and adjusts the flow of steam thereto to achieve the desired vapor temperature (preferably about 220° F.).

The "dry" powder is discharged from fluid bed dryer 24 via line 50 to discharge hopper 36. The polymer, although ideally completely free of liquid hydrocarbon, may contain some residual hydrocarbon. The polymer powder is conveyed from hopper 36 to powder transfer line 52 via line 56 by means of rotary valve 54. The polymer powder and any residual hydrocarbon are then transferred to powder silo 60 via transfer line 52 by means of a carrier gas, preferably a nitrogen/hydrocarbon mixture, which circulates in a loop, as described below.

Nitrogen, or any other suitable purge gas, is supplied to powder silo 60 and flows therethrough in a direction countercurrent to the polymer powder. The purge gas is heated to about 180°-220° F. in a steam heater 62 upstream of powder silo 60. The desired temperature of the purge gas is attained by monitoring the gas temperature output from heater 62 with temperature sensor/valve controller 64, which controls the flow rate of steam to heater 62. The heated purge gas, which purges substantially all of the remaining hydrocarbon from the polymer powder in the silo, exits powder silo 60 and passes through powder transfer filter 66, which filters out entrained solids. The hot powder-free gas (purge gas plus hydrocarbon) is then circulated through line 68 by means of powder transfer blower 70 to powder pick-up point 72 where the polymer powder from discharge hopper 36 is picked up and transferred to transfer filter 66 via transfer line 52. The hot gas flowing through line 68 preferably passes through a cooler 74 which removes the heat of compression imparted by blower 70. The suction pressure of blower 70 is monitored by pressure sensor/valve controller 76, which maintains the desired suction pressure by controlling valve 80 and venting excess gas from line 68 via vent line 78. The vented gas is fed to a vent compressor for recovery.

The polymer powder transferred to filter 66 and the filtered, entrained powder is fed to powder silo 60 for purging with a countercurrent flow of heated purge gas, as described previously. The powder preferably has a residence time in powder silo 60 of about 30 minutes. The volume of gas fed to powder silo 60 is the sum of the purging gas plus the volume of gas lots with the polymer powder output in the void spaces thereof. The dried polymer is discharged from silo 60 via line 82, through valve 84, to subsequent processing equipment, such as pelletizing apparatus. The polymer powder discharged from powder silo 60 preferably has a hydrocarbon content less than about 100 ppm by weight based on the weight of the polymer.

The various apparatus equipment shown in the FIGURE, including fluid conduits, valves, pumps, blowers, filters, flow meters, temperature and pressure monitors and valve controllers, are all standard pieces of equipment and therefore are not described in detail. While the invention has been described with particular reference to the removal of isobutane from a polyethylene polymer slurry, it will be appreciated by persons skilled in the art that the removal of hydrocarbons, including solvents other than isobutane, and/or unreacted monomer or comonomer, from a polymer slurry, can be accomplished utilizing the general principles of the process of the present invention. Therefore, the scope of the present invention is not to be construed as limited to any specific examples given herein, but is to be accorded the scope of the appended claims.

What is claimed is:

1. A process for removing a hydrocarbon from a polymer slurry comprising the steps of:
   feeding a hydrocarbon-containing polymer slurry to a flash tank operated at a pressure sufficiently above atmospheric pressure, in the approximate range of about 70-120 psig, to flash at least about 80% of the hydrocarbon from the slurry;
   feeding the resulting slurry from the flash tank to a fluid bed dryer operated at a pressure in the approximate range of about 1-2 psig;
   stripping additional hydrocarbon from the polymer in the fluid bed dryer utilizing heated hydrocarbon as the stripping gas;
   transferring the resulting polymer from the fluid bed dryer to a powder silo wherein additional hydrocarbon is removed from the polymer utilizing a heated purge gas flowing countercurrent to the polymer;
   venting the hydrocarbon flashed from the slurry in the flash tank and recovering a major portion of said hydrocarbon in a cooling water condenser; and
   collecting from the powder silo polymer powder having a hydrocarbon content below about 100 ppm.

2. The process of claim 1 wherein said hydrocarbon is solvent.

3. The process of claim 2 wherein said hydrocarbon is a solvent and said polymer slurry is a polyolefin slurry.

4. The process of claim 3 wherein said solvent is isobutane and said polyolefin slurry is a polyethylene slurry.

5. The process of claim 4 wherein the powder collected from the powder silo is polyethylene powder which is substantially free of isobutane solvent.

6. The process of claim 5 further comprising venting from the powder silo the purge gas containing the hydrocarbon removed from the polymer.

7. The process of claim 5 further comprising recycling a portion of the isobutane output from the fluid bed dryer as the stripping gas in the fluid bed dryer and recovering a portion of the isobutane in a cooling water condenser.

8. The process of claim 5 wherein the collected polyethylene powder contains between about 50-100 ppm isobutane solvent.

9. The process of claim 4 wherein said flash tank is operated at a temperature in the range of about 110°-135° F.

10. The process of claim 9 wherein the slurry has a residence time in said flash tank of about 15 minutes.

11. The process of claim 10 wherein the stripping gas utilized in the fluid bed dryer is isobutane gas heated to about 220° F.

12. The process of claim 11 wherein the polyethylene has a residence time in said fluid bed dryer in the range of about 7-15 minutes.

13. The process of claim 12 wherein the purge gas utilized in the powder silo is nitrogen heated to about 180°-220° F.

14. The process of claim 13 wherein the polyethylene powder has a residence time in the powder silo of about 30 minutes.

15. A process for removing a hydrocarbon from a polymer slurry comprising the steps of:

feeding a hydrocarbon-containing polymer slurry to a flash tank operated at a pressure sufficiently above atmospheric pressure, in the range of about 70-120 psig and at a temperature in the range of about 110°-135° F., to flash at least about 80% of the hydrocarbon from the slurry;

feeding the resulting slurry from a flash tank to a fluid bed dryer operated at a pressure of about 1-2 psig;

stripping additional hydrocarbon from the polymer in the fluid bed dryer utilizing heated hydrocarbon as the stripping gas;

transferring the resulting polymer from the fluid bed dryer to a powder silo wherein additional hydrocarbon is removed from the polymer utilizing a heated purge gas flowing countercurrent to the polymer;

venting the hydrocarbon flashed from the slurry in the flash tank and recovering a major portion of said hydrocarbon in a cooling water condenser; and collecting from the powder silo polymer powder having a hydrocarbon content below about 100 ppm.

* * * * *